US012704099B2

(12) United States Patent
zur Loye

(10) Patent No.: US 12,704,099 B2
(45) Date of Patent: Aug. 11, 2026

(54) ENGINE CONTROL SYSTEM FOR INTAKE VALVE OPENING TIMING DURING COLD START

(71) Applicant: Cummins Power Generation Inc., Minneapolis, MN (US)

(72) Inventor: Axel O. zur Loye, Battle Ground, WA (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 19/077,805

(22) Filed: Mar. 12, 2025

(65) Prior Publication Data

US 2025/0290459 A1 Sep. 18, 2025

Related U.S. Application Data

(60) Provisional application No. 63/566,772, filed on Mar. 18, 2024.

(51) Int. Cl.
*F02D 41/06* (2006.01)
*F02D 13/02* (2006.01)
(Continued)

(52) U.S. Cl.
CPC ....... *F02D 41/064* (2013.01); *F02D 13/0226* (2013.01); *F02D 13/0234* (2013.01);
(Continued)

(58) Field of Classification Search
CPC .......... F02D 13/0223–0238; F02D 2013/0292; F02D 41/064; F02M 31/042; F02M 31/13
See application file for complete search history.

(56) References Cited

U.S. PATENT DOCUMENTS 7,080,613 B2 * 7/2006 Kuo ........................ F02M 26/01 123/90.11
11,060,497 B2 7/2021 Sellnau et al.
(Continued)

FOREIGN PATENT DOCUMENTS

CN 106677886 B 4/2019
DE 102019114204 A1 * 12/2020 .......... F02B 19/1028
WO WO-99/42718 A1 8/1999

OTHER PUBLICATIONS

Extended European Search Report on EP Appl. Ser. No. 25163670.0 Dated Aug. 12, 2025 (11 pages).
(Continued)

*Primary Examiner* — Laert Dounis
(74) *Attorney, Agent, or Firm* — Foley & Lardner LLP

(57) ABSTRACT

The present disclosure relates to an engine control system. The engine control system includes an intake valve delay system, an electric heater and a controller. The electric heater is structured to increase a temperature of intake air within an engine. The controller is in communication with the engine and the electric heater. The controller is structured to detect a starting condition of the engine. The controller is structured to monitor a temperature value associated with the engine during the starting condition of the engine. The controller is structured to compare the temperature value to a temperature threshold. The controller is structured to initiate, in response to the temperature value being below the temperature threshold, at least one of delaying opening of an intake valve by the intake valve delay system or turning on the electric heater.

20 Claims, 8 Drawing Sheets

(51) Int. Cl.

| | |
|---|---|
| ***F02D 19/06*** | (2006.01) |
| ***F02D 41/00*** | (2006.01) |
| ***F02D 41/02*** | (2006.01) |
| ***F02D 41/14*** | (2006.01) |
| ***F02M 31/13*** | (2006.01) |

(52) U.S. Cl.
CPC ..... *F02D 13/0238* (2013.01); *F02D 41/0002* (2013.01); *F02D 41/0025* (2013.01); *F02D 41/024* (2013.01); *F02D 41/0245* (2013.01); *F02D 41/068* (2013.01); *F02D 41/1446* (2013.01); *F02M 31/13* (2013.01); *F02D 2013/0292* (2013.01); *F02D 19/0649* (2013.01); *F02D 19/0655* (2013.01); *F02D 2041/001* (2013.01); *F02D 2200/021* (2013.01)

(56) References Cited

U.S. PATENT DOCUMENTS

| | | | | |
|---|---|---|---|---|
| 2006/0272608 | A1 | 12/2006 | Hara et al. | |
| 2008/0035125 | A1 * | 2/2008 | Jankovic ............. | F02D 13/0257 123/90.15 |
| 2008/0109149 | A1 | 5/2008 | Magarida et al. | |
| 2010/0043745 | A1 * | 2/2010 | Kuzuyama .............. | F02D 37/02 123/27 R |
| 2021/0054777 | A1 | 2/2021 | Blumreiter et al. | |

OTHER PUBLICATIONS

Sok Ratnak et al: “Fuel-reforming effects on a gasoline direct injection engine under a low-temperature combustion mode: Experimental and kinetics analyses”, Energy Conversion And Management, Elsevier Science Publishers, vol. 255, Feb. 3, 2022 (16 pages).

* cited by examiner

ENGINE CONTROL SYSTEM FOR INTAKE VALVE OPENING TIMING DURING COLD START

CROSS-REFERENCE TO RELATED APPLICATION

This application claims the benefit of and priority to U.S. provisional application No. 63/566,772, filed on Mar. 18, 2024. The entire content of the aforementioned application is incorporated herein by reference.

TECHNICAL FIELD

The present disclosure relates generally to systems and methods for controlling an engine system during cold start conditions. In particular, the present disclosure relates to an ignition control system for intake valve opening timing during cold start.

BACKGROUND

Engine systems can include, for example and without limitation, mono-fuel systems (e.g., using a single type of fuel) as well as dual fuel systems that can operate using a combination of two different fuels. Dual fuel internal combustion engine systems include engines that can operate using a mixture of two different fuels. For example, the dual fuel engine can operate using a combination of diesel fuel and a second fuel such as natural gas, ethanol, methanol, bio-fuel, etc. For some engine systems, it can be challenging to perform operations, including starting operations, under cold temperature conditions. For example, the engine may fail to reach an ignition temperature, or can fail to reach a sufficient temperature to completely combust a fuel. Incomplete combustion can lead to fouling of emissions systems or un-combusted fuel being discharged from an exhaust system.

SUMMARY

An embodiment of the present disclosure relates to an engine control system. The engine control system includes an electric heater, an intake valve delay system, and a controller. The electric heater is structured to increase a temperature of intake air within an engine. The controller is in communication with the engine and the electric heater. The controller is structured to detect a starting condition of the engine. The controller is structured to monitor a temperature value associated with the engine during the starting condition of the engine. The controller is structured to compare the temperature value to a temperature threshold. The controller is structured to initiate, in response to the temperature value being below the temperature threshold, at least one of delaying opening of an intake valve by the intake valve delay system or turning on the electric heater.

In various embodiments, the controller is further configured to monitor the temperature value subsequent to initiating the at least one of delaying opening of the intake valve or turning on the electric heater. In various embodiments, the controller is further configured to initiate, in response to the temperature value being above the temperature threshold, at least one of turning off the electric heater or cancelling the delay of the opening of the intake valve. In various embodiments, the temperature value is at least one of an engine temperature of the engine, an intake air temperature, a coolant temperature, an oil temperature, or an exhaust temperature of exhaust gases from the engine. In various embodiments, the engine is a multi-fuel engine. In various embodiments, the engine has a compression ratio less than 15:1. In various embodiments, the engine is a mono-fuel engine operating on a low cetane number fuel, wherein the low cetane number fuel is at least one of methanol or ethanol. In various embodiments, the intake valve is part of a lost motion system. In various embodiments, the intake valve is part of a variable valve timing system. In various embodiments, the intake valve is part of a variable valve lifting system.

An embodiment of the present disclosure relates to an engine control system. The engine control system includes an electric heater, an aftertreatment system, and a controller. The electric heater is structured to heat intake air of an engine. The controller is in communication with the engine, the electric heater, and the aftertreatment system. The controller is structured to detect a starting condition of the engine. The controller is structured to initiate a regeneration event in the aftertreatment system based on an indication that the aftertreatment system requires regeneration. The controller is structured to detect a low load condition in the engine corresponding to a temperature of exhaust gases of the engine being less that a target temperature for the regeneration event of the aftertreatment system. The controller is structured to initiate, in response to detecting the low load condition, at least one of turning on the electric heater or delaying opening of an intake valve.

In various embodiments, the intake valve opening is delayed on only a subset of a plurality of intake valves. In various embodiments, the controller is further configured to monitor the engine to determine an exhaust temperature value subsequent to initiating the at least one of delaying opening of the intake valve or turning on the electric heater. In various embodiments, the controller is further configured to compare the exhaust temperature value to a threshold. In various embodiments, the controller is further configured to initiate, in response to the exhaust temperature value being above the threshold, a second action, wherein the second action is at least one of turning off the electric heater or not delaying the opening of the intake valve.

An embodiment of the present disclosure relates to an engine assembly. The engine assembly includes an intake valve delay system. The engine assembly includes an electric heater configured to increase a temperature of intake air within the engine. The engine assembly includes at least one controller in communication with the engine and the electric heater. The at least one controller is configured to monitor one or more parameters regarding operation of the engine. The at least one controller is configured to determine that the engine is expected to fail to start or be slow to start based on the one or more parameters. The at least one controller is configured to initiate, in response to determining that the engine is expected to fail to start or be slow to start, at least one of delaying opening of an intake valve by the intake valve delay system or turning on the electric heater.

In various embodiments, the engine system includes an aftertreatment system in communication with the controller. The controller can initiate a regeneration event in the aftertreatment system based on an indication that the aftertreatment system requires regeneration. The controller can detect a load condition in the engine corresponding to a temperature of exhaust gases of the engine being less than a target temperature for the regeneration event of the aftertreatment system. The controller can initiate the delayed opening of the intake valve or the turning on of the electric heater, based on the load condition. In various embodiments, the intake valve opening is delayed on only a subset of a plurality of intake valves including the intake valve. In various embodiments, the at least one controller is further configured to monitor the engine to determine an exhaust temperature value subsequent to initiating the at least one of delaying opening of the intake valve or turning on the electric heater. The controller can compare the exhaust temperature value to a threshold. The controller can initiate, in response to the exhaust temperature value being above the threshold, a second action, wherein the second action is at least one of turning off the electric heater or not delaying the opening of the intake valve.

In various embodiments, the at least one controller is configured to determine that the engine is expected to fail to start based on determining that the one or more parameters do not satisfy one or more thresholds relating to performance of the engine. In various embodiments, the at least one controller is configured to determine that an emissions output of the engine is expected to exceed an emissions output threshold based on the temperature and a fuel composition including multiple fuels.

An embodiment of the present disclosure relates to a method of emissions reduction for cold start engine operation. The method includes detecting a first temperature value associated with an engine at a starting of the engine. The method includes comparing the first temperature value to a first temperature threshold. The method includes, responsive to the first temperature threshold exceeding the first temperature value, engaging an intake valve delay system to delay opening of an intake valve and engaging an electric heater.

In various embodiments, the method includes engaging the electric heater responsive to a comparison of a battery state of charge (SoC) to a SoC threshold. In various embodiments, the method includes determining, based on a fuel composition of a multi-fuel vehicle, the first temperature threshold. In various embodiments, the method includes detecting a second temperature value associated with the engine subsequent to the first temperature value. The method can include comparing the second temperature value to a second temperature threshold, greater than the first temperature threshold. The method can include, responsive to the second temperature value exceeding the second temperature threshold, disengaging one of the intake valve delay system or the electric heater while maintaining the engagement of the other of the intake valve delay system or the electric heater. In various embodiments, the method includes detecting a third temperature value associated with the engine subsequent to the second temperature value. The method can include comparing the third temperature value to a third temperature threshold, greater than the second temperature threshold. The method can include, responsive to the third temperature value exceeding the third temperature threshold, disengaging the other of the intake valve delay system or the electric heater.

It should be appreciated that all combinations of the foregoing concepts and additional concepts discussed in greater detail below are contemplated as being part of the subject matter disclosed herein. In particular, all combinations of claimed subject matter appended at the end of this disclosure are contemplated as being part of the subject matter disclosed herein.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
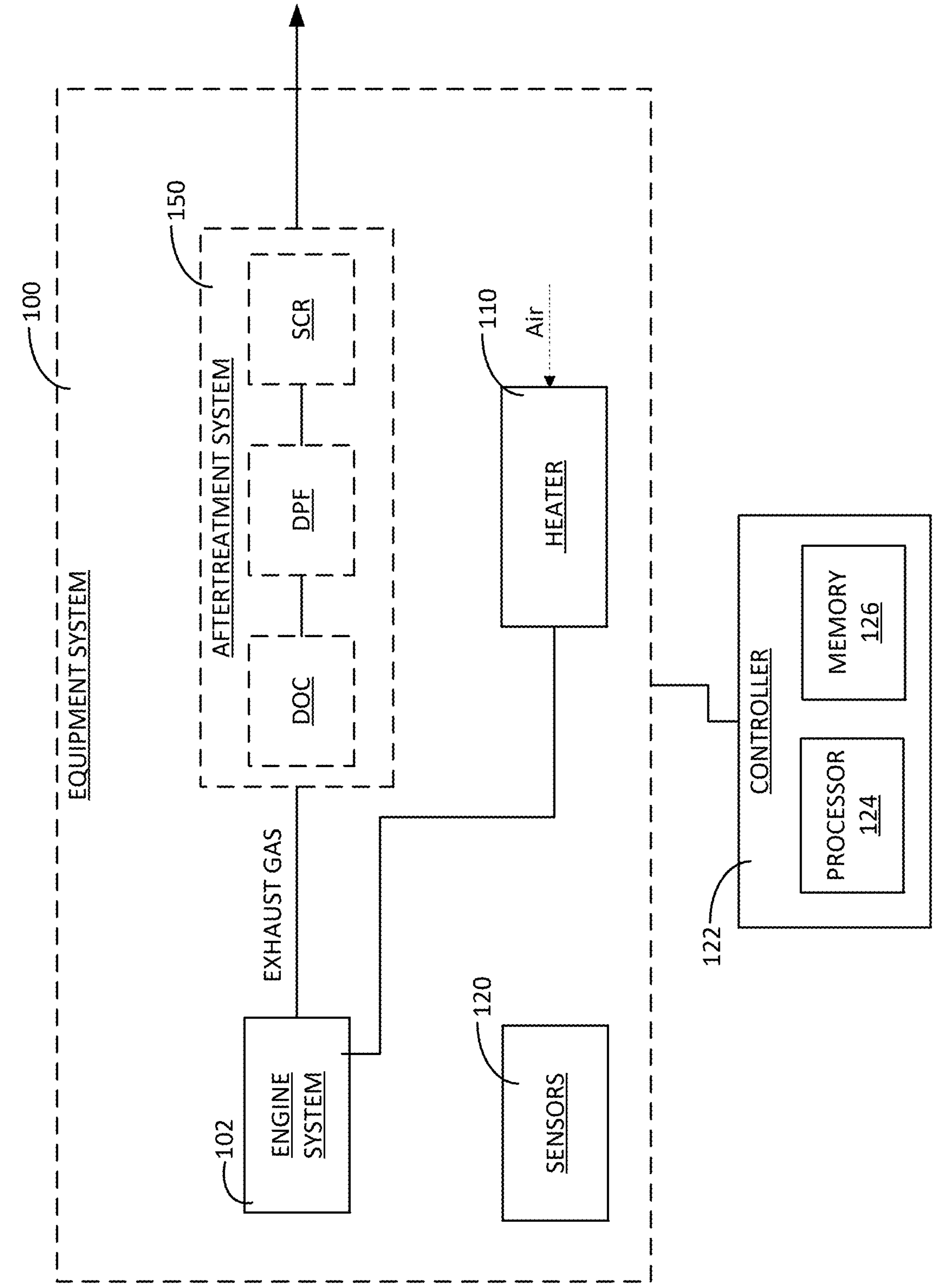
FIG. 1 is a schematic diagram of a controller coupled to an equipment system, according to some embodiments of the present disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to an engine control system that is structured to support starting an engine during cold start conditions. A cold start condition can be present when an engine is started at temperatures below a certain threshold. For example, the temperature thresholds can be −20° C., −15° C., 0° C., etc. When an engine is starting in such temperature condition, the engine can experience a variety of issues including an increased possibility of experiencing engine misfire and an increased amount of emissions. For example, the engine can produce an increased amount of white smoke emissions when the engine is running at light loads during cold start conditions.

The systems and methods described herein provide an engine control system to mitigate the cold start condition. For example, the engine control system can include an intake valve delay system which can be activated to delay the opening of one or more intake valves within a combustion engine during cold start conditions. By delaying the opening of the one or more intake valves, the engine control system can increase the temperature within a cylinder of the combustion engine. Additionally, the compression ignition engine can include a heater which can additionally be turned on to increase the temperature within the combustion engine. When the engine control system determines that the temperature associated with the engine is above a certain threshold, then the intake valve delay system can be deactivated and the heater can be turned off. In some embodiments, the heater and intake valve delay system can be engaged separately from one-another to provide various gradations of temperature adjustment.

In an implementation, the engine control system can include an electric heater configured to increase a temperature of intake air within an engine. In some embodiments, the engine control system includes at least one controller in communication with the engine and the electric heater. In some embodiments, the controller can detect a starting condition of the engine. Responsive to detecting the starting condition, the controller can monitor a temperature value associated with the engine during the starting condition of the engine. Responsive to monitoring the temperature value, the controller can compare the temperature value to a temperature threshold. Then the controller can be structured to initiate, responsive to the temperature value being below the temperature threshold, the at least one of delaying opening of an intake valve or turning on the electric heater. The controller can monitor the temperature value subsequent to initiating the at least one of delaying opening of the intake valve or turning on the electric heater. The controller can initiate, in response to the temperature value being above the temperature threshold, at least one of turning off the electric heater or cancelling and/or reducing the delay of the opening of the intake valve. For example, the engine control system can actuate both the valve delay system and the heater for a first threshold, one of the valve delay system or the heater for a second threshold, greater than the first threshold, and neither of the valve delay system or the heater for a third threshold, greater than the first or second threshold. The engine control system can actuate the other of the valve delay system or the heater for a further threshold, between the second and third thresholds.

In an implementation, the engine control system can include an electric heater configured to heat intake air of an engine, an aftertreatment system, and at least one controller in communication with the engine, the electric heater, and the aftertreatment system. In some embodiments, the controller can initiate a regeneration event in the aftertreatment system based on an indication that the aftertreatment system requires regeneration. The controller can detect a low load condition in the engine corresponding to a temperature of exhaust gases of the engine being less than a target temperature for the regeneration event of the aftertreatment system. In response to detecting the low load condition, the controller can initiate at least one of turning on the electric heater or delaying opening of an intake valve. The controller can further monitor the engine to determine an exhaust temperature value subsequent to initiating the at least one of delaying opening of the intake valve or turning on the electric heater. The controller can further compare the exhaust temperature value to a threshold. In response to the exhaust temperature value being above the threshold, the controller can initiate a second action, wherein the second action is at least one of turning off the electric heater or not delaying the opening of the intake valve. In some embodiments, the second action may include reducing the output of the heater instead of completely turning off the electric heater.

Referring now to FIG. 1, an example of a controller 122 coupled with an equipment system 100 is shown. The equipment system 100 can be included in a vehicle. In some embodiments, the equipment system 100 can be an engine control system. The vehicle can include an on-road or an off-road vehicle including, but not limited to, line-haul trucks, mid-range trucks (e.g., pick-up trucks), cars, boats, tanks, airplanes, locomotives, mining equipment, and any other type of vehicle that can utilize systems to reduce emissions. The vehicle can include a powertrain system, a fueling system, an operator input/output device, one or more additional vehicle subsystems, etc. The vehicle can include additional, fewer, and/or different components/systems, such that the principles, methods, systems, apparatuses, processes, and the like of the present disclosure are intended to be applicable with further vehicle configurations. It should also be understood that the principles of the present disclosure should not be interpreted to be limited to vehicles; rather, the present disclosure is also applicable with stationary pieces of equipment such as a power generator or genset. The equipment system 100 is shown to include the engine system 102, an aftertreatment system 150 coupled with the engine system 102, a heater 110 coupled with the aftertreatment system 150, and sensors 120.

The engine system 102, as shown in FIG. 1 is structured as a compression-ignition internal combustion engine system. In various embodiments, the engine system 102 can be structured as any of various types of internal combustion engine systems (e.g., spark-ignition) that utilize any type of fuel (e.g., gasoline, natural gas). The engine system 102 can be or include an electric motor (e.g., a hybrid drivetrain).

The engine system 102 includes one or more cylinders and associated pistons. Air from the atmosphere is combined with fuel, and combusted, to power the engine system 102. Combustion of the fuel and air in the combustion chambers within one or more cylinders of the engine system 102 produces exhaust gas that can be vented to an exhaust pipe and to the exhaust, as may include an aftertreatment system. In some embodiments, the engine system 102 has a compression ratio representative of a target performance of the engine system 102 and/or the fuel to be used by the engine system 102, such as a compression ratio less than 15:1. In some embodiments, the engine system 102 can be structured as a mono-fuel engine system as described in more detail below with regard to FIG. 2. In some embodiments, the engine system 102 can be structured as a multi-fuel engine system (e.g., a dual fuel engine system) as described in more detail below with regards to FIG. 3.

The aftertreatment system 150 of the exhaust system is structured to receive exhaust gas from the engine system 102 and remove/mitigate emissions from the exhaust gas before the exhaust gas is expelled to the environment. The aftertreatment system 150 can include one or more of a diesel oxidation catalyst (DOC), a diesel particulate filter (DPF), or a selective catalytic reduction (SCR) catalyst.

The heater 110 can couple with the aftertreatment system 150. For example, the heater 110 can couple with the aftertreatment system 150 at a point upstream or downstream from the engine system 102. Heaters coupled upstream of the aftertreatment system 150 can further increase in-cylinder temperatures, as can reduce emissions passed from the engine system 102 to the aftertreatment system 150 (e.g., by decreasing a quantity of un-combusted fuel). The heater 110 can cause at least one of (i) an increase to the temperature of the exhaust gas flowing through the aftertreatment system 150, (ii) an increase the temperature of one or more components of the aftertreatment system 150, (iii) an increase of the temperature of air going into the engine system, or (iv) an increase of the temperature of one or more components of the engine system. Raising the temperature of the exhaust gas and/or the aftertreatment system 150 with the heater 110 can increase the efficiency of one or more catalysts of the aftertreatment system 150. In some embodiments, the heater 110 is coupled to an intake air system to heat intake air for engine. For example, such a heater can be positioned upstream or downstream of an intake compressor (e.g., a turbo or supercharger).

In some instances, operation of the heater 110 places an additional load on the engine system 102 to provide enough power to operate the heater 110. In some embodiments, adding the additional load on the engine will result in an additional increase in the exhaust temperature, but will also increase the fuel consumption of the engine system 102. In some embodiments, the electric heater is engaged based on a battery state. For example, a controller can compare a state of charge (SoC) of a battery to an SoC threshold. Such operation can avoid depletion of a battery, as may further correspond to low temperatures. In some embodiments, the battery SoC can be monitored, such that the heater can be engaged if the SoC rises above an SoC threshold prior to an operating condition of the engine changing (e.g., prior to the engine warming up to reach a temperature threshold). In some embodiments, another aspect of a battery state can be compared, such as voltage, as may reduce current draw during startup to reduce load on a battery during cranking.

The sensors 120 are coupled with the controller 122 and to one or more of the systems of the equipment system 100 (or of other systems/components of the associated vehicle). The sensors 120 are configured to detect and/or determine values associated with various properties of the equipment system 100 or vehicle. Accordingly, the sensors 120 can include one or more of a temperature sensor to determine a temperature of the intake air, coolant, oil, exhaust gas, etc. (e.g., a thermocouple, a resistance temperature detector, etc.,); a particulate matter sensor (e.g., to determine the amount of particulate matter in the exhaust gas); an emission sensor (e.g., to determine an emissions output such as a proportion of oxygen and nitrous oxides in the exhaust gas, which is indicative of the level of emissions in the exhaust gas and thus the efficiency of the engine, as may be compared to an emissions output threshold); a vibration sensor; a noise sensor; an engine speed sensor; a vehicle speed sensor; an engine torque sensor; sensors for the fueling system (e.g., to track a fuel injected quantity, a rail pressure, etc.); and so on. In some embodiments, certain of the sensors 120 are combined into a single sensor. In some embodiments, the sensors 120 are separate sensors. In some embodiments, a plurality of sensors (e.g., a plurality of temperature sensors, a plurality of particulate matter sensors, and/or a plurality of emission sensors) can be used, or the controller 122 can calculate sensor data based on input from other sensor data (e.g., infer a temperature based on a combustion timing).

The controller 122 is coupled with the systems/components of the equipment system 100. The controller 122 can implement the methods described in FIGS. 6-8. The controller 122 can include one or more processors 124 coupled with at least one memory 126. The processor 124 can include a microprocessor, an application-specific integrated circuit (ASIC), a field-programmable gate array (FPGA), etc., or combinations thereof. The memory 126 can include, but is not limited to, electronic, optical, magnetic, or any other storage or transmission device capable of providing a processor, ASIC, FPGA, etc. with program instructions. The memory 126 can include a memory chip, Electrically Erasable Programmable Read-Only Memory (EEPROM), Erasable Programmable Read Only Memory (EPROM), flash memory, or any other suitable memory from which the controller 122 can read instructions. For example, at least one of the memories can be provided as a non-transitive memory to store the instructions. The processor 124 can execute the instructions from the non-transitive memory or load the instructions from the non-transitive memory to another memory and execute the instructions from the other memory.

The instructions can include code from any suitable programming language. The memory 126 can include various modules that include instructions which are configured to be executed or otherwise implemented by the processor 124. Although an example processor 124 and memory 126 of controller 122 have been described with respect to FIG. 1, the subject matter including the operations described in this specification can be implemented in other types of digital electronic circuitry, or in computer software, firmware, or hardware, including the structures disclosed in this specification and their structural equivalents, or in combinations of one or more of them. The processor 124 and/or memory 126 can be implemented as hardware for performing operations other than control operations, including but not limited to any of various data storage, communication, and/or processing operations.

The controller 122 can be at least partially implemented by or can be communicably coupled with any of various control hardware (not shown) associated with operation of the engine system 102, including but not limited to an engine control unit (ECU) or engine control module (ECM). In some embodiments, the controller 122 can receive or detect one or more signals, such as electrical signals or electronic signals, regarding operation of the engine system 102. For example, the controller 122 can activate the heater 110 to heat one or more components of the engine system 102 or the aftertreatment system 150 based on determining a temperature associated with the equipment system 100 is below a certain threshold. Specifically, the heater 110 may heat the intake air of the engine system 102. As another example, the controller 122 can implement delayed intake valve opening within an engine responsive to determining a temperature associated with the equipment system 100 is below a certain threshold. In some embodiments, the controller 122 can implement delayed intake valve opening responsive to an indication that the starting the engine will be challenged.

During periods in which the engine system 102 is operating (e.g., performing combustion, such as to facilitate movement of the equipment system 100 or generate electrical energy), the engine system 102 can produce emissions resulting from combustion of fuel. The emissions can be reduced by the aftertreatment system 150. For certain operating conditions, the efficiency of the aftertreatment system 150 can be increased by operation of the heater 110. For example, when the engine is idling, the exhaust temperature is low causing the aftertreatment system 150 to be less efficient. In such cases, the controller 122 may turn on the heater 110 to implement delayed intake valve opening to increase the temperature of the exhaust gas as needed. In some implementations, the controller 122 controls the activation and/or disabling of the heater 110 according to factors such as the conversion efficiency of the aftertreatment system 150 being above a corresponding threshold value and/or the temperature of the aftertreatment system 150 being greater than a corresponding threshold temperature. In some embodiments the threshold value can be any number greater than or equal to 90% (e.g., 93%, 95%, 99%, etc.). In some arrangements, the threshold temperature is approximately 250° C. (e.g., plus-or-minus 10° C.). The threshold temperature can vary according to the age of the engine system 102 or other aspects of the engine system 102. Various such control schemes implemented by the controller 122 can be useful in instances where at least one of certain conditions presented (e.g., engine system 102 idling, conversion efficiency of the aftertreatment system 150 greater than a threshold value, and temperature of the aftertreatment system 150 greater than a threshold value) is not met, such as to avoid an instance in which disabling the heater 110 can result in higher emissions released to the environment as compared to maintaining the heater 110 in an operational state.

In some embodiments, the heater 110 may be operated at one or more gradated levels or a continuously varying curve (e.g., 100%, 50%, 25%, etc.). In such an embodiment, disabling the heater may refer to operating the heater at a lower level. For example, if the heater 110 is operating at 100%, the operation of the heater may be lowered to 50%.

Figure 2:
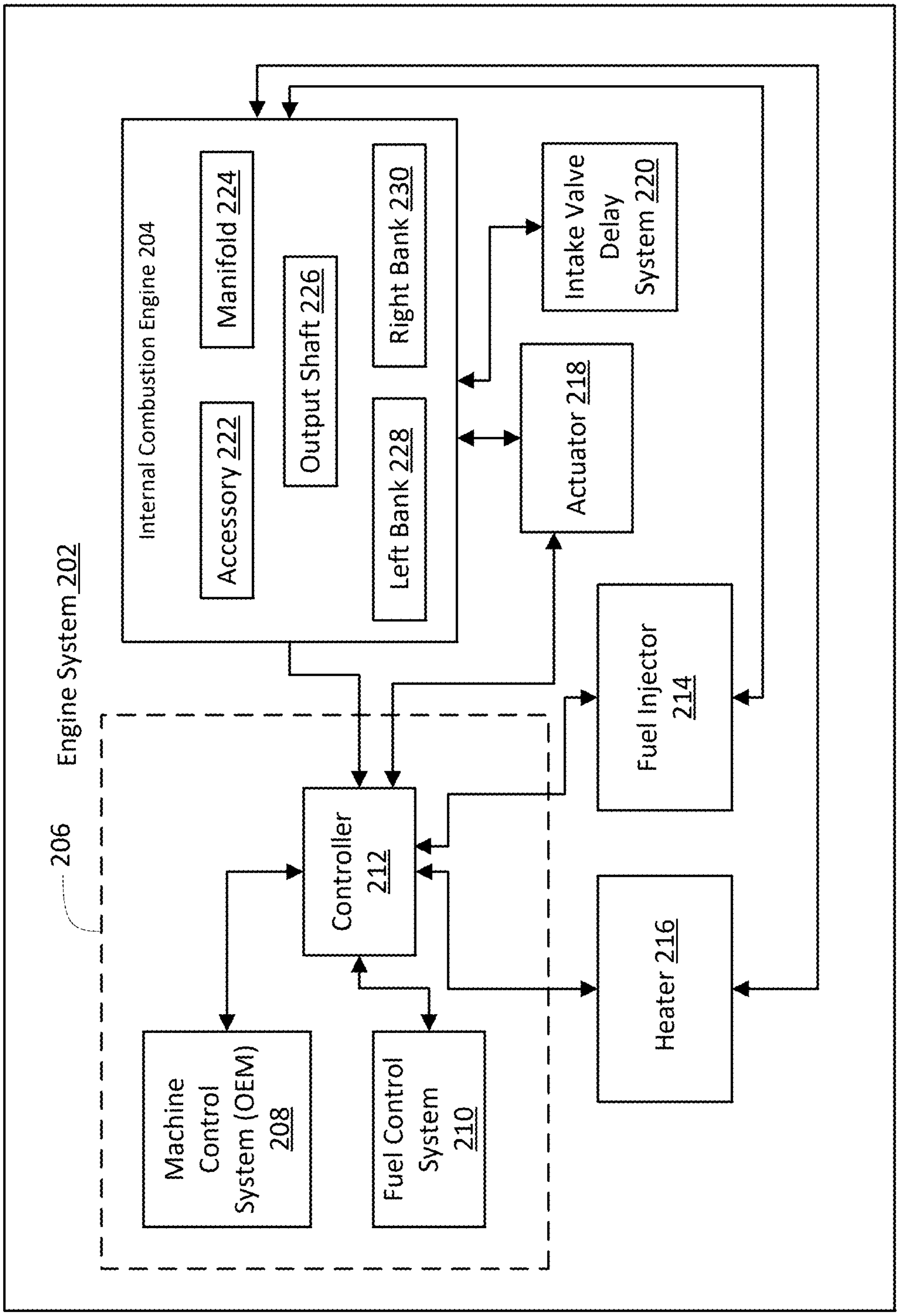
FIG. 2 is a schematic diagram of an engine system, according to some embodiments of the present disclosure.

Referring to FIG. 2, a block diagram of an example of a mono-fuel engine system 202 is shown (e.g., the engine system 102 of FIG. 1, which may further correspond to further references of an engine or engine system 102). The mono-fuel engine system 202 is an engine having a single fuel operation mode (e.g., is to operate using only a single fuel or blend of fuels received from a single source). The fuel can be at least one of diesel fuel, natural gas fuel, methanol, ethanol, e-fuels, or other biofuels, for example. In some embodiments, the fuel can be any one of a high cetane number fuel, such as diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76 fuel, F-34 fuel, jet A fuel, JP-4 fuel, JP-8 fuel, oxymethylene ether (OME), or a low cetane number fuel (e.g., a high octane number fuel, or a high methane number fuel). The low cetane number fuel can be, for example, natural gas, hydrogen, ethane, propane, butane, syngas, ammonia, methanol, ethanol, or gasoline. In some embodiments, the engine is a mono-fuel engine operating on a low cetane number fuel, wherein the low cetane number fuel is at least one of methanol or ethanol. The fuel can be a blend of fuels. It should be appreciated that the foregoing are merely examples of fuels, and other types of fuels are not precluded. In various embodiments, the mono-fuel engine system 202 is configured for one or more oil and gas production applications (e.g., land-based oil and/or gas drilling and hydraulic fracturing).

As shown in FIG. 2, the mono-fuel engine system includes an internal combustion engine 204, which is operably coupled with a control system 206 via at least one controller 212. In some embodiments, the engine 204 is a mono-fuel engine. The control system 206 can include at least one of a machine control system (OEM system) 208 or a fuel control system 210. The control system 206 can send one or more inputs to the controller 212, responsive to which the controller 212 can control the internal combustion engine 204. In various embodiments, the fuel control system 210 and its components are configured to operate using the fuel. In some embodiments, the fuel control system can be gas fuel control system. In some embodiments, the fuel control system can be a liquid fuel control system. In various embodiments, the fuel control system 210 cooperatively operate within the internal combustion engine 204.

In various embodiments, the controller 212 is configured to include a processor and a non-transitory computer readable medium (e.g., a memory device) having computer-readable instructions stored thereon that, when executed by the processor, cause the at least one controller 212 to carry out one or more operations. In various embodiments, the at least one controller 212 is a computing device (e.g., a microcomputer, microcontroller, or microprocessor). In other embodiments, the at least one controller 212 is configured as part of a data cloud computing system configured to receive commands from a user control device and/or remote computing device. For example, the controller 212 (and further controllers 212 provided herein) can be the controller 122 of FIG. 1.

The controller 212 can include one or more processors and a memory. The one or more processors can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing a processor, ASIC, FPGA, etc. with program instructions. The memory can include a memory chip, Electrically Erasable Programmable Read-Only Memory (EEPROM), Erasable Programmable Read Only Memory (EPROM), flash memory, or any other suitable memory from which the controller can read instructions. The instructions can include code from any suitable programming language. The memory can include various modules that include instructions which are configured to be executed or otherwise implemented by the one or more processors. The subject matter including the operations described in this specification can be implemented in other types of digital electronic circuitry, or in computer software, firmware, or hardware, including the structures disclosed in this specification and their structural equivalents, or in combinations of one or more of them. The one or more processor and/or memory can be implemented as hardware for performing operations other than control operations, including but not limited to any of various data storage, communication, and/or processing operations.

The controller 212 can be at least partially implemented by or can be communicably coupled with any of various control hardware (not shown) associated with operation of the engine system 202, including but not limited to an engine control unit (ECU) or engine control module (ECM). In some embodiments, the controller 212 can receive or detect one or more signals, such as electrical signals or electronic signals, regarding operation of the engine system 202. For example, the controller 212 can be operably coupled with and activate the heater 216. The heater 216 may be configured to heat intake air for the engine system 202.

The controller 212 can be operably coupled with the at least one fuel injector 214 to facilitate injection of the fuel. The controller 212 can be operably coupled with and at least one actuator 218. In some embodiments, the fuel injector 214 is a gaseous fuel injector. In other embodiments, the fuel injector 214 is a liquid fuel injector. In some embodiments, each of the fuel injector 214, the heater 216, and the actuator 218 are operably coupled with the internal combustion engine 204. In various embodiments, the fuel injector 214 is configured to control or facilitate injection of the fuel (e.g., gas or a liquid, or a second gas) into the internal combustion engine 204. The actuator 218 can include one or more first fuel type (e.g., diesel type or other liquid type, first gas type) actuators, air handling actuators, aftertreatment actuators, or any other type of actuator within the mono-fuel engine system 202. Accordingly, during operation, the controller 212 can send one or more inputs to one or more of the internal combustion engine 204, the fuel injector 214, the heater 216, or the actuator 218 to facilitate a desired mode of operation of the mono-fuel engine system 202.

In some embodiments, the mono-fuel engine system 202 includes an intake valve delay system 220. The intake valve delay system 220 can be configured to delay the opening of an intake valve within the internal combustion engine 204, such as under certain conditions (e.g., one or more conditions detected by the controller 212 and/or intake valve delay system 220). For example, the intake valve delay system 220 can delay the opening of an intake valve during a cold start condition, such as responsive to detection of a cold start condition by the controller 212. In some embodiments, the intake valve delay system 220 can be a lost motion system. In such an embodiment, the intake valve is part of the lost motion system (e.g., for variable valve timing (VVT)). The lost motion system can implement a variable valve actuation procedure to delay the opening of an intake valve. In another embodiment, the intake valve delay system 220 can be another variable valve timing system. In such an embodiment, the intake valve can be part of a variable valve timing system or a cam phasing system. In another embodiment, the intake valve delay system 220 can be a variable valve lifting system. In the variable valve lifting system, the intake valve opening can use two separate intake cam lobes and a mechanism which switches between two values each associated with the two separate intake cam lobes. In such an embodiment, the intake valve opening switches between two timing values (e.g., a default and/or normal timing value and a delayed timing value). For example, the intake valve can be a part of the variable valve lifting system intake cam lobes.

As shown, the internal combustion engine 204 includes an output shaft 226 and can also include one or more accessories 222, such as an alternator. The internal combustion engine 204 further includes at least one manifold 224. In various embodiments, the at least one manifold 224 includes, but is not limited to an intake manifold. The internal combustion engine 204 also includes at least one engine cylinder bank. In some embodiments, the at least one engine cylinder bank includes a left bank 228 and a right bank 230. During operation of the mono-fuel engine system 202, the control system 206 can receive one or more inputs from a user and/or one or more sensors within the mono-fuel engine system 202 and control operation of at least one of the internal combustion engine 204, the fuel injector 214, or the actuator 218 via the controller 212.

Figure 3:
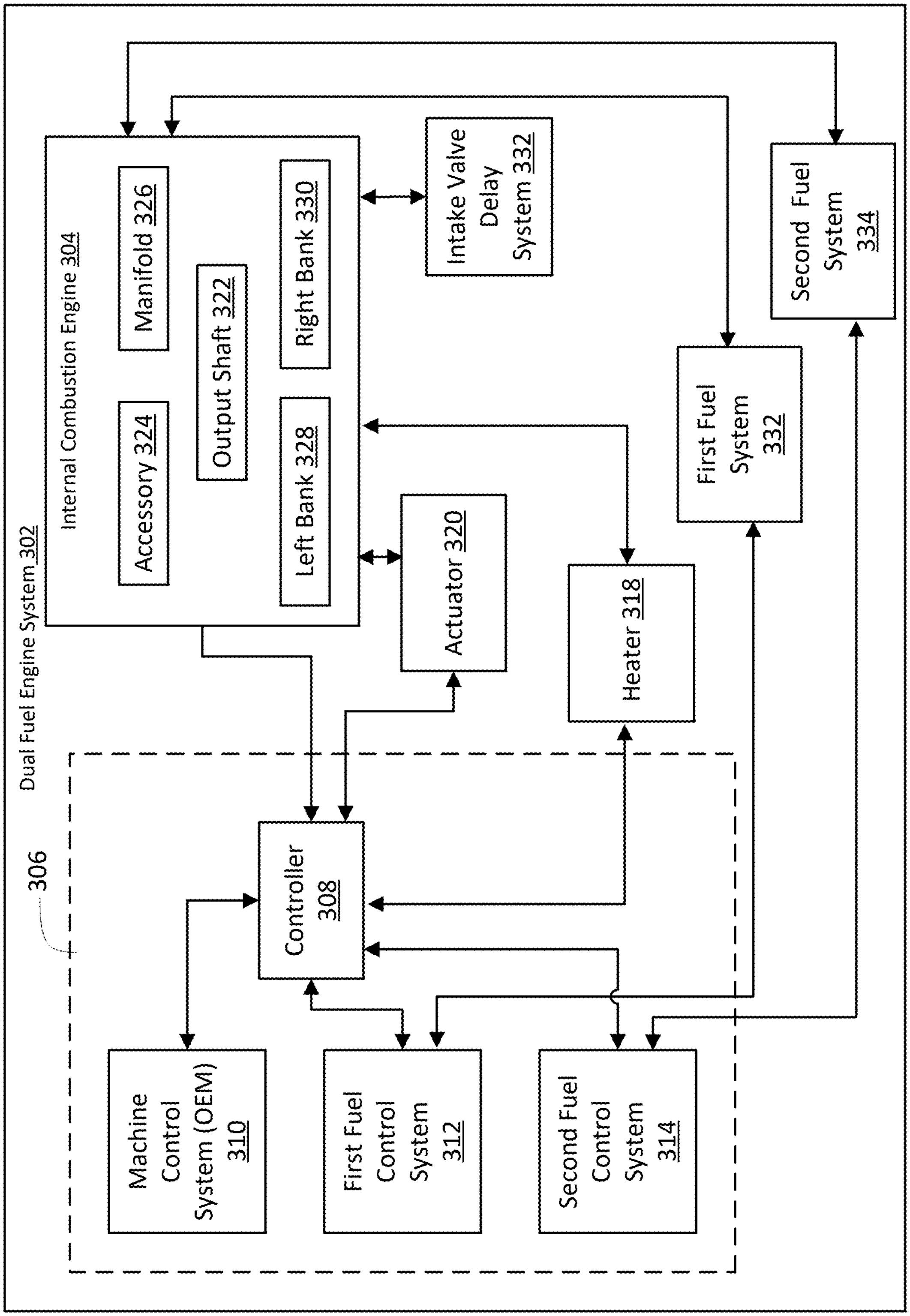
FIG. 3 is a schematic diagram of a dual fuel engine system, according to some embodiments of the present disclosure.

Referring to FIG. 3, a block diagram of a dual fuel engine system 302 is shown, according to an exemplary embodiment. The dual fuel engine system 302 is configured to be an engine having a dual fuel operation mode, the engine is configured to operate using two different fuels. Dual fuel systems are not limited to the first and second fuels, and can include further multiple fuels. For this reason, the dual fuel systems are sometimes referred to multi-fuel systems without limiting effect. For example, such a system can include a tertiary fuel, quaternary fuel, and so on, in addition to the first and second fuel.

The engine can be configured to operate using the first fuel and the second fuel, where the first fuel and the second fuel have different properties and/or chemical compositions. The properties can include auto-ignition temperatures, flame speeds, etc. The fuels can include diesel and natural gas, for example. For example, the first fuel can be a diesel fuel, as may sometimes be referred to as a primary fuel. The second fuel can be, for example, natural gas, an e-fuel or liquid biofuel as may sometimes be referred to as a substitute fuel. The liquid biofuel can be methanol and/or ethanol, for example. The first fuel or the second fuel can be any one of a high cetane number fuel, such as diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76 fuel, F-34 fuel, jet A fuel, JP-4 fuel, JP-8 fuel, or oxymethylene ether (OME), or a low cetane number fuel (e.g., a high octane number fuel, a high methane number fuel). The low cetane number fuel can be, for example, natural gas, hydrogen, ethane, propane, butane, syngas, ammonia, methanol, ethanol, or gasoline. The first fuel and/or the second fuel can optionally be a blend of fuels. It should be appreciated that the foregoing are merely examples of fuels, and other types of first and second fuels are not precluded. In various embodiments, the dual fuel engine system 302 is configured for one or more oil and gas production applications (e.g., land-based oil and/or gas drilling and hydraulic fracturing).

As shown in FIG. 3, the dual fuel engine system includes an internal combustion engine 304, which is operably coupled with a control system 306 via at least one controller 308. The control system 306, which includes a machine control system (OEM system) 310, a first fuel control system 312, and a second fuel control system 314, is configured to send one or more inputs to the controller 308, where the controller 308 then controls the internal combustion engine 304. In various embodiments, the first fuel control system 312 is configured to control a first fuel system 332. The first fuel system 332 and its components are configured to operate using the first fuel. The first fuel system 332 is a fuel delivery system which may include one or more fuel injectors configured to inject the first fuel into the internal combustion engine 304.

In other embodiments, the second fuel control system 314 is configured to control a second fuel system 334. The second fuel system 332 and its components are configured to operate using the second fuel. The second fuel system 334 is a fuel delivery system which may include one or more fuel injectors configured to inject the second fuel into the internal combustion engine 304. In some embodiments, the one or more fuel injectors are gaseous injectors. In some embodiments, the one or more fuel injectors are liquid fuel injectors. For example, in various embodiments, the first fuel control system 312 is a diesel control system and the second fuel control system 314 is a gas control system. In some embodiments, the first fuel control system 312 is a first gas control system and the second fuel control system 314 is a second gas control system. In yet other embodiments, one or both of the first fuel control system 312 and the second fuel control system 314 can be liquid fuel control systems.

In some embodiments, each of the first fuel control system 312 and the second fuel control system 314 and their respective components can selectively operate using either the first fuel or the second fuel. In some embodiments, the first fuel control system 312 and the second fuel control system 314 cooperatively operate within the internal combustion engine 304.

In various embodiments, the controller 308 is configured to include a processor and a non-transitory computer readable medium (e.g., a memory device) having computer-readable instructions stored thereon that, when executed by the processor, cause the at least one controller 308 to carry out one or more operations. In various embodiments, the at least one controller 308 is a computing device (e.g., a microcomputer, microcontroller, or microprocessor). In some embodiments, the at least one controller 308 is configured as part of a data cloud computing system configured to receive commands from a user control device and/or remote computing device.

The controller 308 can include one or more processors and a memory (as referred to above with regard to controllers 122, 212). The one or more processors can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing a processor, ASIC, FPGA, etc. with program instructions. The memory can include a memory chip, Electrically Erasable Programmable Read-Only Memory (EEPROM), Erasable Programmable Read Only Memory (EPROM), flash memory, or any other suitable memory from which the controller can read instructions. The instructions can include code from any suitable programming language. The memory can include various modules that include instructions which are configured to be executed or otherwise implemented by the one or more processors. The subject matter including the operations described in this specification can be implemented in other types of digital electronic circuitry, or in computer software, firmware, or hardware, including the structures disclosed in this specification and their structural equivalents, or in combinations of one or more of them. The one or more processor and/or memory can be implemented as hardware for performing operations other than control operations, including but not limited to any of various data storage, communication, and/or processing operations.

The controller 308 can be at least partially implemented by or can be communicably coupled with any of various control hardware (not shown) associated with operation of the engine system 302, including but not limited to an engine control unit (ECU) or engine control module (ECM). In some embodiments, the controller 308 can receive or detect one or more signals, such as electrical signals or electronic signals, regarding operation of the engine system 302. For example, the controller 308 can be operably coupled with and activate the heater 318. The heater 316 may be configured to heat intake air for the engine system 202, or otherwise, as described above with regard to heaters 110, 216.

The following description generally relates to a system in which the first fuel control system 312 operates using the first fuel and the second fuel control system 314 operates using the second fuel, however, it should be understood that in other embodiments, each of the first and second fuel control system 312, 314 can be selectively configured to operate using either the first fuel or the second fuel, or further fuels, as described above. The controller 308 can be operably coupled with at least one actuator 320. In some embodiments, each of the heater 318 and the actuator 320 are operably coupled with the internal combustion engine 304. The actuator 320 can include one or more first fuel types (e.g., diesel type or other liquid type, first gas type) actuators, air handling actuators, aftertreatment actuators, or any other type of actuator within the dual fuel engine system 302. Accordingly, during operation, the controller 308 can send one or more inputs to one or more of the internal combustion engine 304, the heater 318, or the actuator 320 to facilitate a desired mode of operation of the dual fuel engine system 302.

In some embodiments, the dual fuel engine system 302 includes an intake valve delay system 332. The intake valve delay system 332 can be configured to delay the opening of an intake valve within the internal combustion engine 304 to increase the temperature of the gases in the internal combustion engine 304 under certain conditions. The conditions can include a condition where the engine is expected to fail to start or be slow to start. For example, the intake valve delay system 332 can delay the opening of an intake valve during cold start conditions. In some embodiments, the intake valve delay system 332 can be a lost motion system. In such an embodiment, the intake valve is part of the lost motion system. The lost motion system can implement a variable valve actuation strategy to delay the opening of an intake valve. In another embodiment, the intake valve delay system 332 can be another variable valve timing system. In such an embodiment, the intake valve can be part of a variable valve timing system or a cam phasing system. In another embodiment, the intake valve delay system 332 can be a variable valve lifting system. In a variable valve lifting system, the intake valve opening can use two separate intake cam lobes and a mechanism which switches between two values. In such an embodiment, the intake valve can form a part of the variable valve lifting system intake cam lobes so that the intake valve opening switches between the two timing values (e.g., one normal opening timing value and one delayed opening timing value.

As shown, the internal combustion engine 304 includes an output shaft 322 and can also include one or more accessories 324. The internal combustion engine 304 can further includes at least one manifold 326. In various embodiments, the at least one manifold 326 includes, but is not limited to an intake manifold. The internal combustion engine 304 generally includes at least one engine cylinder bank. In some embodiments, the at least one engine cylinder bank includes a left bank 328 and a right bank 333 (e.g., in a vee-engine configuration, such as a V-8, V-12, V-16 or so forth). During operation of the dual fuel engine system 302, the control system 306 can receive one or more inputs from a user and/or one or more sensors within the dual fuel engine system 302. The control system 306 can control operation of at least one of the internal combustion engine 304 or the actuator 320 via the controller 308.

Figure 4:
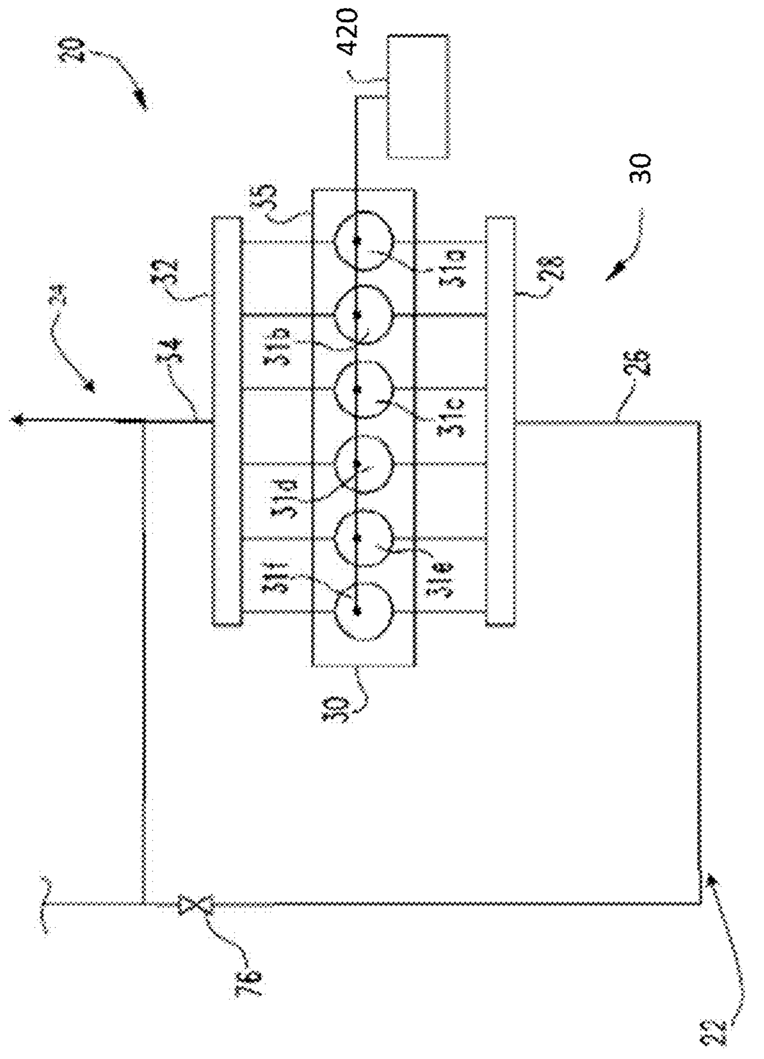
FIG. 4 is a schematic illustration of a portion of an internal combustion engine system, according to some embodiments of the present disclosure.
Figure 5:
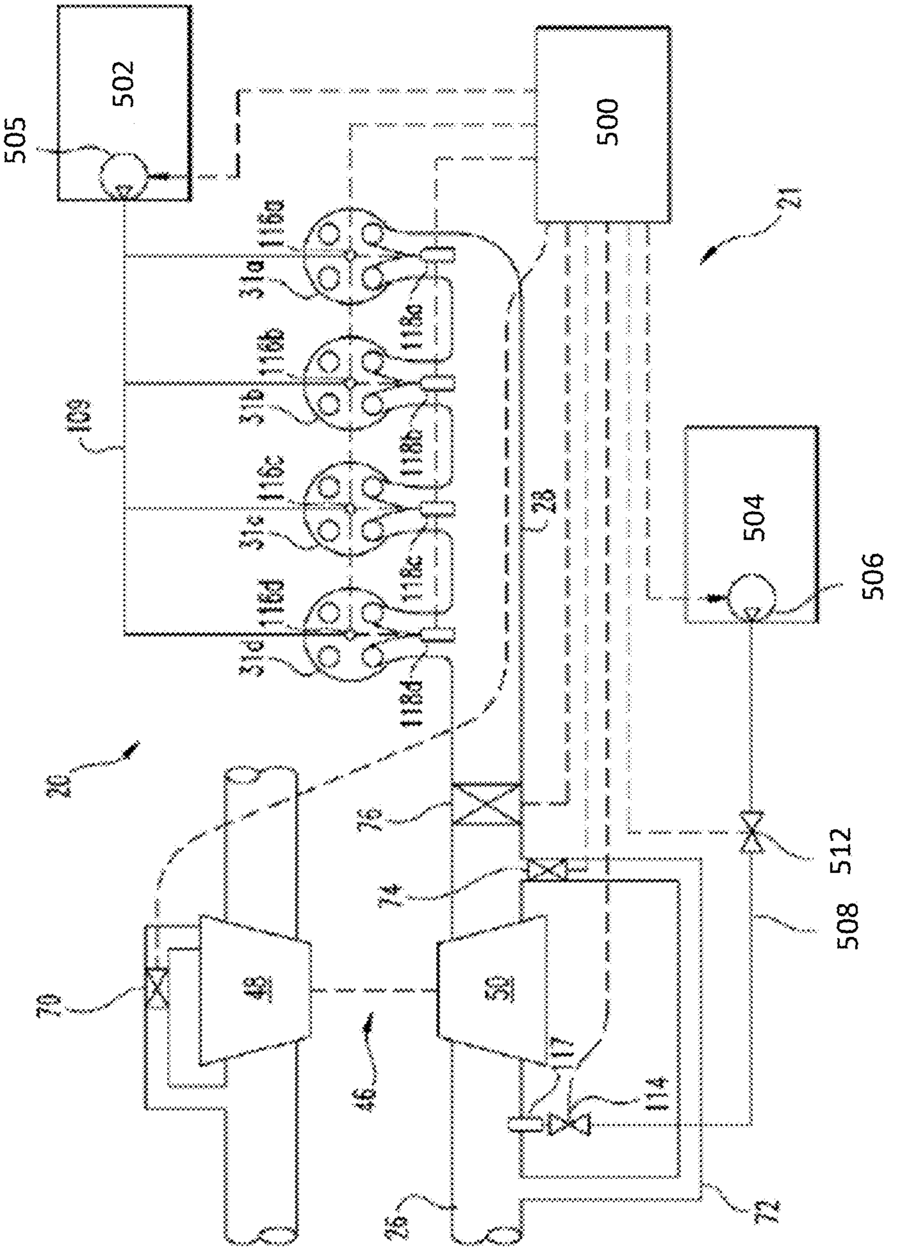
FIG. 5 is a schematic illustration of another portion of the internal combustion engine system of FIG. 4, according to some embodiments of the present disclosure.
Figure 6:
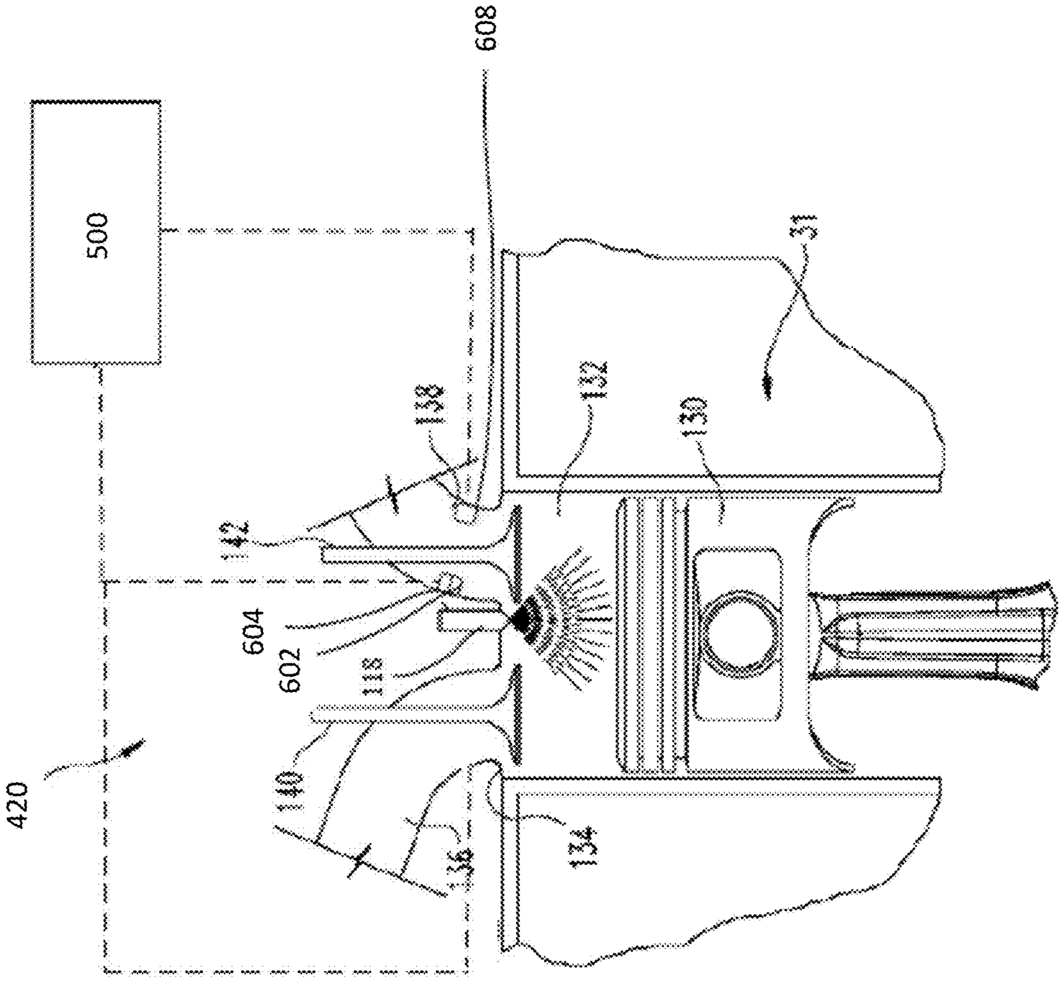
FIG. 6 is a schematic illustration of a cylinder and a control system of the internal combustion engine system of FIG. 4, according to some embodiments of the present disclosure.

Referring now to FIGS. 4-6, examples of an internal combustion engine system 20 are shown, according to an exemplary embodiment. The depicted internal combustion engine system 20 is provided as an example of the engine system 102 of FIG. 1. The internal combustion engine system 20 is configured to control combustion in an internal combustion engine 30 of a vehicle (e.g., passenger vehicle, commercial vehicle, construction vehicle, etc.) using a control system 420. The internal combustion engine system 20 can be configured to control combustion in an internal combustion engine 30 or various other equipment powered by the engine 30 (e.g., stationary equipment, such as a generator set, a locomotive or other rail equipment, agricultural or construction equipment, an industrial vehicle such as a mine haul truck, a marine vessel, a plane, a helicopter, or other equipment capable of flight, etc.). The internal combustion engine system 20 controls combustion using the control system 420. For example, the control system 420 can control a plurality of cylinders 31 of the internal combustion engine 30 (e.g., a multi-cylinder engine, etc.) to balance combustion performance among the plurality of cylinders 31. For example, an intake valve opening can be applied to a subset of a plurality of intake valves.

FIGS. 4-6 depict an exemplary control system 420 of the internal combustion engine system 20. The internal combustion engine system 20 is configured to control combustion and includes an internal combustion engine 30 having a plurality of cylinders 31, each having a temperature sensor 602. A control system 420 can control the plurality of cylinders 31 of the internal combustion engine 30. The control system 420 includes a controller configured to receive information relating to a plurality of operational parameters of each of the plurality of cylinders 31 of the internal combustion engine 30. The controller 500 can measure, for each of the plurality of cylinders 31 of the internal combustion engine 30, an exhaust temperature from the temperature sensor 602. In addition, the controller 500 can evaluate, for each of the plurality of cylinders 31 of the internal combustion engine 30, one or more of the plurality of operational parameters with respect to the measured exhaust temperature. Further still, the controller 500 is configured to adjust, for one or more of the plurality of cylinders 31 of the internal combustion engine 30, one or more of the plurality of operational parameters to control the combustion among the plurality of cylinders 31. For example, various cylinders can exhibit varying temperatures, according to a position within the engine block, thermal sinking with other vehicle components, fuel or air delivery variance, or so forth.

Further, in some embodiments, a control system 420 for an internal combustion engine 30 includes a temperature sensor 602 configured to measure, in an exhaust manifold 32, an exhaust gas temperature from a cylinder 31 of the internal combustion engine 30. In addition, the control system 420 includes a controller 500 operably connected to the temperature sensor 602. The controller 500 is configured to receive the measured exhaust gas temperature from the temperature sensor 602.

The internal combustion engine system 20 includes a fueling system 21. The fueling system 21 can operably couple with the internal combustion engine system 20 to provide fueling for the internal combustion engine 30 from a first fuel source 502 (and a second fuel source 504, ins some instances). The internal combustion engine system 20 includes an internal combustion engine 30. The internal combustion engine 30 is configured to connect with an intake system 22 for providing a charge flow to the internal combustion engine 30 and an exhaust system 24 for output of exhaust gases. In some embodiments, the internal combustion engine 30 is configured as a lean combustion engine such as a diesel cycle engine. In some embodiments, the internal combustion engine 30 is configured as an Otto cycle or spark ignition engine. In some embodiments, the internal combustion engine 30 (e.g., diesel cycle engine, spark ignition engine, etc.) is configurable as a dual fuel engine. The dual fuel engine is an engine configured to use a primary fuel from first fuel source 502 (e.g., a liquid fuel such as diesel fuel) and a secondary fuel from the second fuel source 504 (e.g., a gaseous fuel such as hydrogen or natural gas). In some embodiments, the primary fuel and the secondary fuel have different properties such as different auto-ignition temperatures, flame speeds, etc.

In some embodiments, the primary fuel is a liquid fuel, as noted above, and the secondary fuel can be, for example, hydrogen, a mixture containing hydrogen, natural gas, biogas, methane, propane, ethanol, methanol, producer gas, field gas, liquefied natural gas, compressed natural gas, or landfill gas. However, as discussed in further detail herein, the foregoing are merely examples of fuels, and other types of primary and secondary fuels are not precluded, such as any suitable liquid fuel and gaseous fuel or a combination thereof. For example, in some embodiments, the first fuel is a diesel fuel and the second fuel is ethanol, methanol, natural gas, ammonia, or hydrogen. In some embodiments, the first fuel and second fuel are combined in a blend that is a mixture containing one or more fuels. In some embodiments, the first fuel and the second fuel are delivered via separate mechanisms (e.g., the first fuel is delivered via a direct injector and the second fuel is delivered via a different introduction point such as a port injector) and then mixed. In some embodiments, the internal combustion engine 30 is a dual fuel engine configured to receive a combination of a first fuel and a second fuel. A control system for such an engine can determine whether to adjust one or more of a plurality of operational parameters includes determining whether to adjust the fuel composition, the fuel composition corresponding to a ratio of the first fuel to the second fuel in the mixture. In some embodiments, the fuel composition is adjusted to attain a target combustion performance, as may include a torque or power produced, or an emissions level.

Further, in some embodiments, the internal combustion engine 30 is one of a spark-ignited engine, a pilot-ignited engine, a compression-ignited engine, or a dual fuel engine. In some embodiments, the internal combustion engine 30 is a port-injected hydrogen fueled engine or a direct-injected hydrogen fueled engine. In some embodiments, the internal combustion engine 30 is at least one of a methanol fueled engine, an ethanol fueled engine, hydrogen fueled engine, a natural gas fueled engine, a propane fueled engine, or an ammonia fueled engine.

The first fuel source 502 can include a first fuel pump 505 that is connected to the controller 500. The second fuel source 504 can include a second fuel pump 506 that is connected to the controller 500. The first fuel pump 505 and the second fuel pump 506 can each provide pressurized fuel. However, in some embodiments, such as an internal combustion engine system 20 using gas-phased fuels (e.g., hydrogen, natural gas, etc.), the first fuel pump 505 or the second fuel pump 506 can be omitted. In some embodiments, the internal combustion engine system 20 further includes cylinders 31*a*, 31*b*, 31*c* and 31*d*. Each of the cylinders 31*a-d* includes an injector, such as direct injectors 116*a*-116*d* or port injectors 118*a*-118*d* associated with each of the illustrated cylinders 31*a*-31*d*.

The first fuel pump 505 can connect to each of the direct injectors 116*a*-116*d* or injectors 118*a*-118*d* with a first fuel line 109. The first fuel pump 505 can provide a first fuel flow from first fuel source 502 to each of the cylinders 31*a*-31*d*. For example, the direct injectors 116*a*-116*d* or the port injectors 118*a*-118*d* associated with each of the cylinders 31*a*-31*d* can control the first fuel flow to adjust the first fuel flow and an injection timing for each of the cylinders 31*a*-31*d*. The first fuel pump 505 is configured to supply the first fuel flow at any one or more of a rate, amount, and/or timing determined by the controller 500 to produce a desired power and exhaust output from cylinders 31 from the first fuel source 502. The second fuel source 504 is connected to the inlet of a compressor 50 with mixer 117 with a second fuel line 508. In another embodiment, the second fuel source 504 is connected through the port injectors 118*a*-118*d*. A shutoff valve 112 can be provided in the second fuel line 508. The shutoff valve 112 can be provided at one or more other locations in the fueling system 21 that is connected to the controller 500. The second fuel pump 506 is operable to provide a second fuel flow from the second fuel source 504. For example, the second fuel pump 506 is configured to provide the second fuel flow in an amount determined by the controller 500 to produce a desired power and exhaust output from the cylinders 31 with fuel from the second fuel source 504.

As noted above, the internal combustion engine system 20 includes an intake system 22. The intake system 22 can include one or more inlet supply conduits 26 connected to an engine intake manifold 28, which distributes the charge flow to cylinders 31 of the engine 30. In some embodiments, the intake system 22 receives the charge flow from a turbocharger 46 upstream of the intake system 22. In some embodiments, the turbocharger 46 is omitted. The intake system 22 includes the engine intake manifold 28 having an intake port 136 and is configured to distribute the charge flow to the internal combustion engine 30. In some embodiments, the intake port 136 includes an intake valve 140. In some embodiments, the intake system 22 includes an after-cooler or an inter-cooler. In some embodiments, the internal combustion engine system 20 includes multiple turbochargers arranged in parallel or in series (e.g., two-stage turbo charging).

In some embodiments, the intake system 22 further includes the compressor 50. The compressor 50 compresses air or an air fuel mixture from, for example, the second fuel source 504 with the charge flow for delivery to combustion chambers 132 of the plurality of cylinders 31. The intake system 22 can further include a compressor bypass 72 that connects a downstream or outlet side of the compressor 50 to an upstream or inlet side of the compressor 50. The compressor bypass 72 can include a control valve 74 that is selectively opened to allow charge flow to be returned to the inlet side of the compressor 50. The selective opening of the control valve 74 aids the reduction of compressor surge under certain operating conditions, such as when an intake throttle 76 is closed.

As mentioned above, the internal combustion engine system 20 includes an exhaust system 24. The exhaust system 24 releases exhaust gases produced by combustion of fuel by the internal combustion engine 30. The exhaust system 24 can include an exhaust manifold 32 having an exhaust port 138 and configured to receive the exhaust gas. In some embodiments, the exhaust port 138 includes an exhaust valve 142. The exhaust system 24 can include an exhaust conduit 34 extending from exhaust manifold 32 to the turbine 48 of the turbocharger 46. In one embodiment, the exhaust conduit 34 is fluidly coupled with the exhaust manifold 32, and can include one or more intermediate flow structures, which are sometimes referred to as passages or conduits.

As described above, the exhaust conduit 34 can extend to a turbine 48 of the turbocharger 46 to provide the exhaust gases to the turbocharger 46 (although the turbocharger 46 can be omitted or substituted for another compressor, such as a supercharger). The turbine 48 can include a controllable wastegate 70 or other suitable bypass that is operable to selectively bypass at least a portion of the exhaust flow from the turbine 48 to reduce boost pressure and engine torque under certain operating conditions. In another embodiment, the turbine 48 is a variable geometry turbine with an inlet that is selectively modulated to permit a desired amount of exhaust flow therethrough.

The internal combustion engine 30 includes a cylinder 31, sometimes referred to as a combustion cylinder. The illustrated example of the internal combustion engine 30 includes four cylinders **31*a*-31*d* (collectively referred to as the plurality of cylinders 31) in an in-line arrangement. However, the number of the plurality of cylinders 31 can vary, and the arrangement of the plurality of cylinders 31 (or banks) can be any arrangement, and is not limited to the number and arrangement shown in FIG. 4. In some embodiments, each of the plurality of cylinders 31 are connected to the intake system 22 to receive the charge flow distributed to each cylinder 31. Further, each cylinder 31 includes a piston 130 and a cylinder head 134. Each of the cylinders 31, its respective piston 130, and the cylinder head 134 form a combustion chamber 132. In the illustrated embodiment, the internal combustion engine 30 includes four such combustion chambers 132. However, it is contemplated that the internal combustion engine 30 can include additional or fewer combustion chambers 132 corresponding to the additional or fewer cylinders 31. The cylinders 31 and the combustion chambers 132 can be disposed in an in-line configuration, a V-configuration, or in any other suitable configuration. In some embodiments, each of the plurality of cylinders 31 includes at least one injector 116, 118 for delivering fuel to the combustion chamber 132. In some embodiments, the injectors 116, 118, are, for example, direct injectors 116*a*-116*d* or port injectors 118*a*-118*d* for providing fuel to the cylinders 31**.

The internal combustion engine system 20 includes a control system 420 (e.g., a controller, microcontroller, engine control unit (ECU), etc.). The control system 420 can be configured to control the plurality of cylinders 31 of the internal combustion engine 30. In some embodiments, the control system 420 can include various control components for tailoring the contribution of a gaseous fuel source from, for example, the second fuel source 504 to the operating conditions in the cylinders 31.

The internal combustion engine system 20 includes a temperature sensor 602 (e.g., thermocouple, thermometer, thermistor, etc.). In some embodiments, the control system 420 is configured to communicate with the temperature sensor 602. In some embodiments, the temperature sensor 602 is coupled with the exhaust manifold 32. The temperature sensor 602 is configured to be coupled with an exhaust port 138 of the exhaust manifold 32 or to a part of the exhaust manifold 32 other than the exhaust port 138. Further still, in some embodiments, each of the plurality of cylinders 31 includes a respective temperature sensor 602. The temperature sensor 602 is configured to measure an exhaust gas temperature of exhaust gas. Further, a temperature sensor can be disposed upstream of the engine, such as between a compressor and an engine intake, or upstream of the compressor.

In some embodiments, the control system 420 includes the pressure sensor 608. The pressure sensor 608 can measure a signal indicative of one or more of a knock, a peak cylinder pressure, or a heat release rate. In some embodiments, the pressure sensor 608 in the form of an in-cylinder pressure sensor (ICPS) to measures the cylinder pressure. The resulting signal can be processed to give an indication of one or more of knock, heat release rate, peak cylinder pressure, combustion phasing (e.g., CA50, a crank angle where approximately 50% of the heat has been released), etc. In some embodiments, the pressure sensor 608 is coupled with the combustion chamber or the cylinder head 134. In some embodiments, the pressure sensor 608 can be positioned elsewhere including one of the engine intake manifold 28, or an engine block 35 which at least partially defines the cylinders 31. However, in some embodiments, the pressure sensor 608 is coupled with the exhaust manifold 32. Further still, in some embodiments, each of the plurality of cylinders 31 can include the pressure sensor 608. Although the exemplary, non-limiting embodiments discussed herein describe the temperature sensor 602, and the pressure sensor 608 as being separate sensors, in some embodiments, the temperature sensor 602, and the pressure sensor 608 can be combined in a single sensor or in any other combination.

In some embodiments, the control system 420 includes a controller 500 (e.g., processor, control circuit, etc.). The controller 500 can include one or more of a programmable microcontroller or a microprocessor, a logic circuit, a digital/analog circuit, a programmable logic circuit, a field programmable logic gate array, a memory, etc. The controller 500 receives inputs from one or more components in the control system 420 and provides control signals to actuate one or more actuators or circuits within the control system 420. The controller 500 can be communicably coupled with a memory (volatile or non-volatile), which can store data and instructions that can be executed by the controller. In some instances, the data and instructions can be stored in one or more non-volatile computer readable storage mediums, such as, for example, flash drives, read-only-memories (ROMs), cloud storage, etc. Further, other aspects of the controller 500 can be provided as referred to various controllers of the present disclosure, which are not repeated in the interest of brevity.

The controller 500 can determine whether to adjust one or more of a plurality of operational parameters based on the target combustion performance. For example, the controller 500 can evaluate, for each of the plurality of cylinders 31, one or more of the plurality of operational parameters with respect to the measured exhaust temperature and the measured exhaust NOx amount. Based on the determination of whether to adjust the one or more operational parameters, the controller 500 is configured to perform an adjustment. The adjustment can include an actuation (e.g., engagement or disengagement) of the heater or intake valve delay system.

The controller 200 can determine whether an overall engine combustion performance differs from a target engine performance. For example, the controller 200 can be configured to the operation of the intake valve delay system or the heater in response to the measured exhaust temperature and the measured exhaust NOx amount. Such an operation can be performed separately or in conjunction with determining whether to adjust operational parameters or performing an adjustment of the operational parameters.

Figure 7:
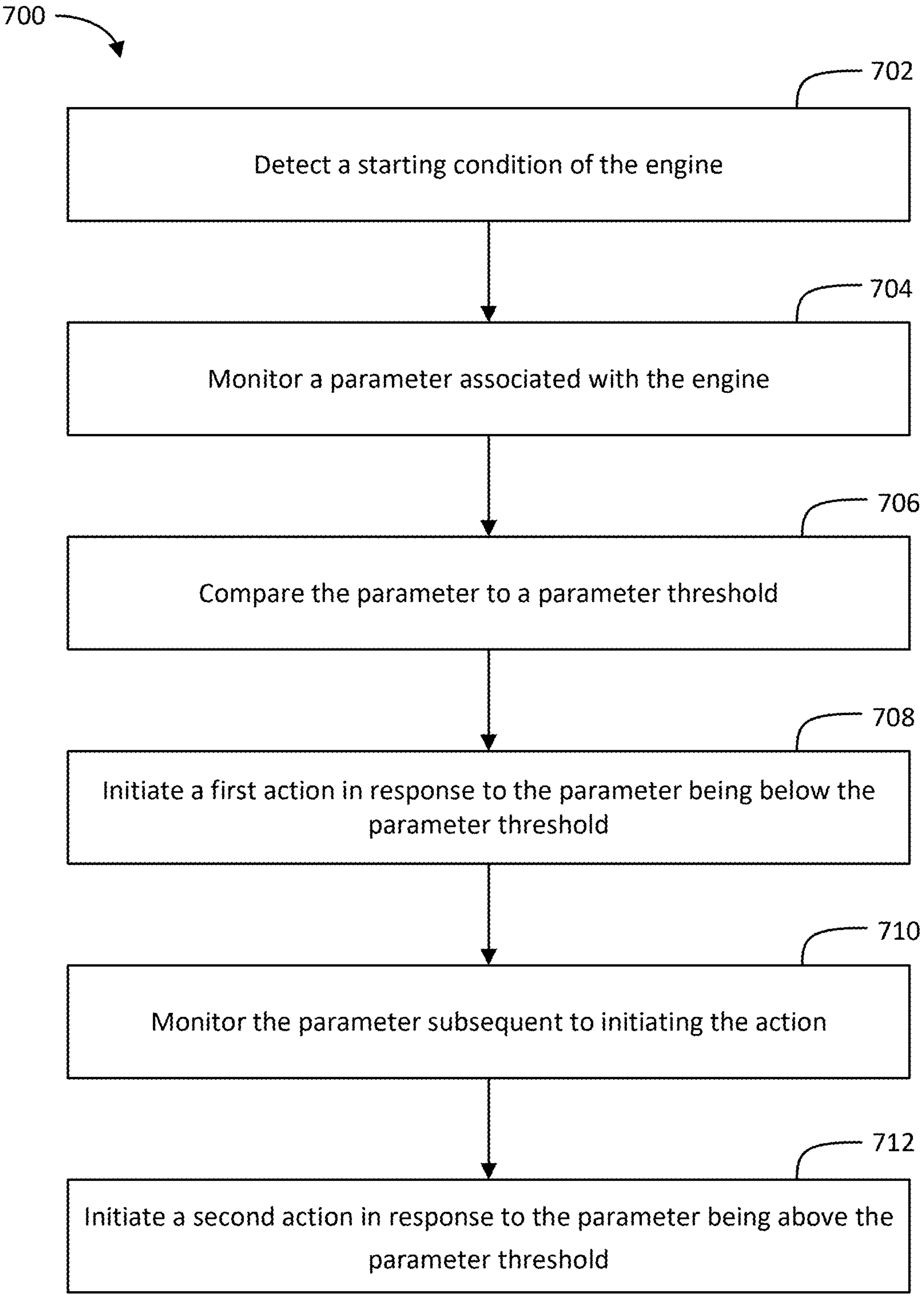
FIG. 7 is a flow diagram of a first method of operating the equipment system to mitigate cold start conditions, according to some embodiments of the present disclosure.

Referring to FIG. 7, a method 700 of for controlling the engine system is shown, according to at least one embodiment. The method 700 can be implemented with any of the engine systems described with reference to FIGS. 1-6. For example, a controller can schedule, initiate, or otherwise cause the executions of, and transitions between, the various operations of the present method 800. In some embodiments, the method 700 can include additional, fewer, and/or different operations. The method 700 can aid emissions reductions.

Operation 702 includes detecting a starting condition of a vehicle (e.g., a multi-fuel vehicle). To start an engine such as engines 204 and 304, the engine is turned at some speed, while it receives (e.g., draws) fuel and air into the cylinders, and compresses the fuel-air mixture as described above. In some embodiments, the starting condition can be detected by a sensor which determines whether the engine is operating at a certain speed (e.g., RPMs). In some embodiments, the starting condition can also be detected using different methods such as measuring the temperature of the engine, an ambient environment, or other aspects of air temperature.

Operation 704 includes monitoring one or more parameters associated with the engine. For example, the conditions can be monitored before, during, or after the starting condition of the engine. In some embodiments, a temperature value and a pressure value associated with the engine can be monitored. In some embodiments, the temperature value is at least one of an engine temperature of the engine, an intake air temperature, a coolant temperature, an oil temperature, or an exhaust temperature of exhaust gases from the engine. In some embodiments, the following parameters can also be monitored: engine speed, exhaust port temperature, turbine inlet temperature, aftertreatment inlet temperature, intake temperature, intake pressure, coolant temperature, oil temperature, fuel rate. These operating conditions can be used determine the starting condition of the engine (e.g., whether a cold start condition is present). The parameters can be monitored using various sensors, such as any of the sensors described above with respect to FIGS. 1-6. In some embodiments, a controller can determine a starting condition of the engine system based on the parameters. For example, the controller can determine a first starting condition that describes a “cold start” starting condition where temperatures associated with the engine at start are below a certain threshold (or otherwise satisfy a threshold). As described above, a cold starting condition can cause a variety of issues including white smoke emissions, partial combustion, misfire, etc. As another example, the controller can determine the second starting condition that describes a “normal start” starting condition where temperatures associated with the engine at start are above a certain threshold.

Operation 706 includes comparing the parameter to a parameter threshold to determine whether the engine is in a cold start starting condition or a normal starting condition. If the controller determines that the temperature parameter is below a certain threshold or the pressure parameter is either below or above a certain threshold, the controller can determine that the engine is in a cold start condition. In a cold start operating condition, the engine can have poor combustion due to insufficient temperatures (e.g., white smoke emissions, etc.). In response to the controller determining a cold starting condition, the controller can issue a command to mitigate the cold starting condition according to at least one action, such as the first action of operation 708 or the second action of operation 712.

Operation 708 incudes initiating a first action in response to the parameter being below the parameter threshold. As described above, the controller can be configured to issue a command to initiate an action to mitigate the cold start condition for cold start engine operation. In some embodiments, the first action can be delaying the opening of an intake valve using the intake valve delay systems 332 and 220 which are described in more details above. In some embodiments, the first action can additionally or alternatively include turning on a heater associated with the engine.

Operation 710 incudes monitoring the parameter subsequent to initiating the first action. The parameters can be monitored to determine whether the engine is still in the starting condition determined above. In some embodiments, this can be determined based on comparing the parameter(s) to a parameter threshold. Similar to what was described above, the parameters can be temperature values or pressure values associated with the engine. In some embodiments, the parameters can also include an engine speed. The controller may determine that once the engine speed or the rate at which the engine speed is increasing exceeds a certain threshold, the vehicle is no longer in a starting condition. The subsequent parameters can be monitored using one or more sensors described above. A threshold for determination of a starting condition can vary somewhat from a threshold for exiting the starting condition, to induce hysteresis.

Operation 712 includes initiating a second action in response to the subsequently monitored parameters being above the parameter threshold. In some embodiments, the second action can be stopping or reducing the delaying of the opening of an intake valve using the intake valve delay systems 332 and 220. In some embodiments, the second action can additionally or alternatively include turning off or reducing the power of a heater associated with the engine.

Figure 8:
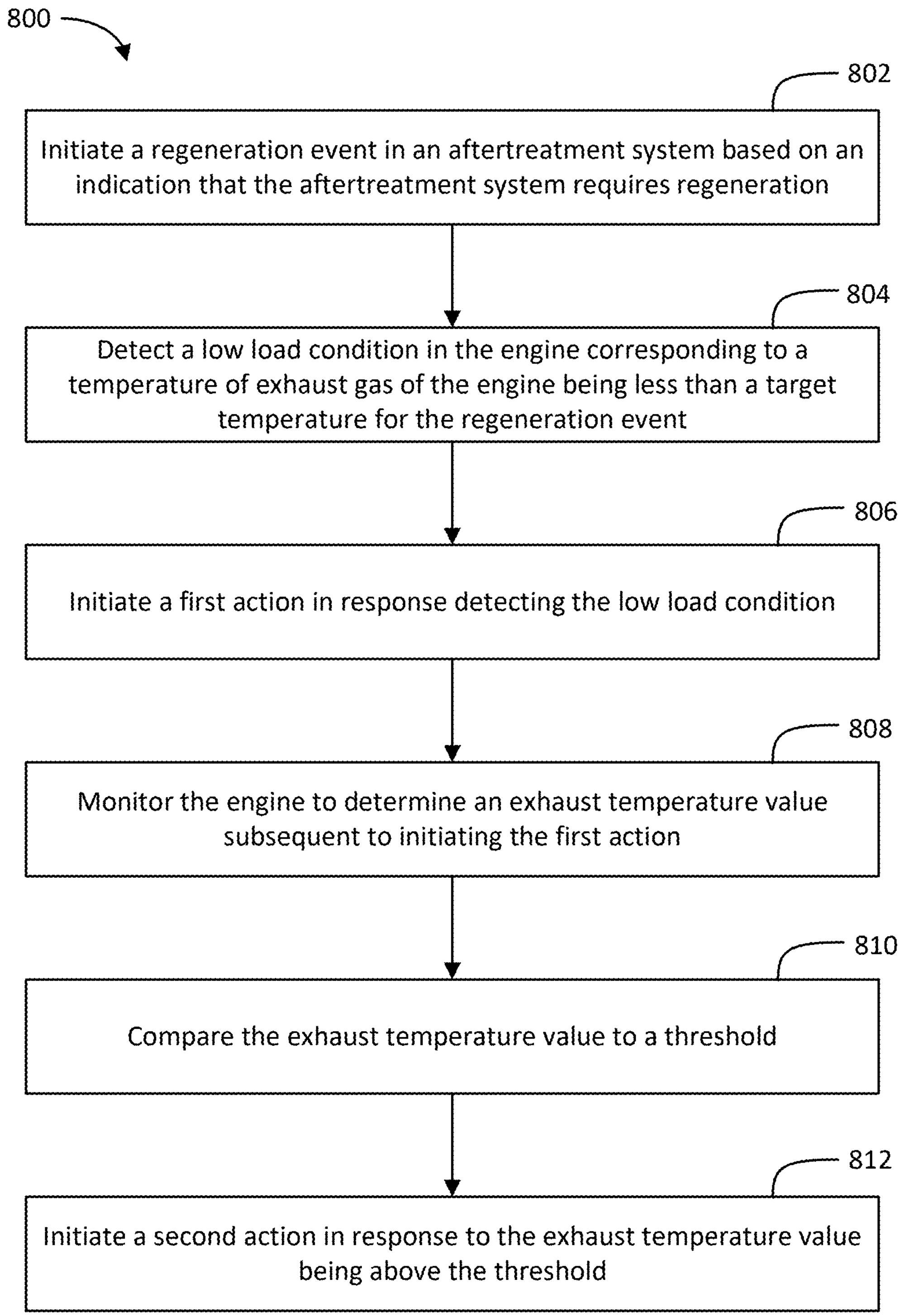
FIG. 8 is a flow diagram of a second method of operating the equipment system to mitigate cold start conditions, according to some embodiments of the present disclosure.

Referring to FIG. 8, a method 800 for controlling the engine system is shown, according to at least one embodiment. The method 800 can be implemented with any of the engine systems described with reference to FIGS. 1-6. For example, a controller can schedule, initiate, or otherwise cause the executions of, and transitions between, the various operations of the present method 800. In some embodiments, the method 800 can include additional, fewer, and/or different operations. The method 700 can aid emissions reductions.

Operation 802 includes initiating a regeneration event in an aftertreatment system based on an indication that the aftertreatment system requires regeneration. The indication that the aftertreatment system requires regeneration may include, for example, the number of hours since the last regeneration event, the amount of fuel burned since the last regeneration event, or a pressure drop across the aftertreatment system surpassing a certain threshold. In some embodiments, the controller can determine when the engine requires a regeneration event and sends a command to the aftertreatment system to initiate a regeneration event.

Operation 804 includes detecting a low load condition or any other condition in the engine that corresponds to a temperature of exhaust gas of the engine being less than a target temperature for the regeneration event. The low load condition can be defined as a condition where the exhaust temperature is too low to result in the desired re-generation of the aftertreatment system. In some embodiments, the low load condition can be determined by comparing a parameter associated with the vehicle to one or more thresholds. For example, the temperature parameter can be compared to a temperature threshold.

Operation 806 incudes initiating a first action in response to detecting the low load condition. The controller can be configured to issue a command to initiate an action to mitigate the low load condition (e.g., exhaust temperature being too low, or another indication, such as an engine RPM, cylinder temperature, or oil temperature). In some embodiments, the first action can be delaying the opening of an intake valve using the intake valve delay systems 332 and 220 which are described in more details above. In some embodiments, the first action can additionally or alternatively include turning on a heater associated with the engine.

Operation 808 includes monitoring an exhaust temperature value subsequent to initiating the first action. The parameters can be monitored to determine whether the engine is still in the starting condition determined above (e.g., a low load condition). In some embodiments, this can be determined based on comparing the parameter(s) to a parameter threshold in operation 810. The subsequent parameters can be monitored using one or more sensors described above.

Operation 812 includes initiating a second action in response to the subsequently monitored parameters being above the parameter threshold. In some embodiments, operation 812 can include initiating, in response to the exhaust temperature value being above the threshold, a second action. In some embodiments, the second action can be stopping the delaying of the opening of an intake valve using the intake valve delay systems 332 and 220. In some embodiments, the second action can additionally or alternatively include turning off a heater associated with the engine.

The various concepts described above can be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which can vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining can be stationary (e.g., permanent) or moveable (e.g., removable or releasable). Such joining can be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. Other substitutions, modifications, changes and omissions can also be made in the design, operating conditions and arrangement of the various exemplary embodiments without departing from the scope of the embodiments described herein.

While this specification contains specific implementation details, these should not be construed as limitations on the scope of any embodiment or of what can be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. An engine control system, comprising:

an electric heater configured to increase a temperature of intake air within an engine; and at least one controller in communication with the engine and the electric heater, the at least one controller being configured to:

detect a starting condition of the engine;

monitor a first temperature value associated with the engine during the starting condition of the engine;

compare the first temperature value to a first temperature threshold;

initiate, in response to the first temperature value being below the first temperature threshold, at least one of delaying opening of an intake valve by an intake valve delay system or turning on the electric heater;

detect a second temperature value associated with the engine subsequent to the first temperature value;

compare the second temperature value to a second temperature threshold, greater than the first temperature threshold; and responsive to the second temperature value exceeding the second temperature threshold, disengage one of the intake valve delay system or the electric heater while maintaining the engagement of the other of the intake valve delay system or the electric heater.

2. The engine control system of claim 1, wherein the at least one controller is further configured to:

initiate, in response to the first temperature value being below the first temperature threshold, delaying opening of the intake valve by an intake valve delay system and turning on the electric heater;

monitor the first temperature value subsequent to initiating the at least one of delaying opening of the intake valve or turning on the electric heater; and initiate, in response to the first temperature value being above the first temperature threshold, at least one of turning off the electric heater or cancelling the delay of the opening of the intake valve.

3. The engine control system of claim 1, wherein the first temperature value is at least one of an engine temperature of the engine, an intake air temperature, a coolant temperature, an oil temperature, or an exhaust temperature of exhaust gases from the engine.

4. The engine control system of claim 1, wherein the engine is a multi-fuel engine.

5. The engine control system of claim 1, wherein the engine has a compression ratio less than 15:1.

6. The engine control system of claim 1, wherein the engine is a mono-fuel engine operating on a low cetane number fuel, wherein the low cetane number fuel is at least one of methanol or ethanol.

7. The engine control system of claim 1, wherein the intake valve is part of a lost motion system.

8. The engine control system of claim 1, wherein the intake valve is part of a variable valve timing system.

9. The engine control system of claim 1, wherein the intake valve is part of a variable valve lifting system.

10. An engine comprising:

an intake valve delay system;

an electric heater configured to increase a temperature of intake air within the engine; and at least one controller in communication with the engine and the electric heater, the at least one controller being configured to:

monitor a first value of one or more parameters regarding operation of the engine;

determine that the engine is expected to fail to start or be slow to start based on the first values of the one or more parameters;

initiate, in response to determining that the engine is expected to fail to start or be slow to start, at least one of delaying opening of an intake valve by the intake valve delay system or turning on the electric heater;

detect a temperature value of the one or more parameters associated with the engine subsequent to the first values;

compare the temperature value to a temperature threshold; and responsive to the temperature value exceeding the temperature threshold, disengage one of the intake valve delay system or the electric heater while maintaining the engagement of the other of the intake valve delay system or the electric heater.

11. The engine of claim 10, further comprising an aftertreatment system in communication with the controller, the controller being configured to:

initiate a regeneration event in the aftertreatment system based on an indication that the aftertreatment system requires regeneration;

detect a load condition in the engine corresponding to a temperature of exhaust gases of the engine being less than a target temperature for the regeneration event of the aftertreatment system; and initiate the delayed opening of the intake valve or the turning on of the electric heater, based on the load condition.

12. The engine of claim 10, wherein the intake valve opening is delayed on only a subset of a plurality of intake valves comprising the intake valve.

13. The engine of claim 10, wherein the at least one controller is further configured to:

monitor the engine to determine an exhaust temperature value subsequent to initiating the at least one of delaying opening of the intake valve or turning on the electric heater;

compare the exhaust temperature value to a threshold; and initiate, in response to the exhaust temperature value being above the threshold, a second action, wherein the second action is at least one of turning off the electric heater or not delaying the opening of the intake valve.

14. The engine of claim 10, wherein the at least one controller is configured to determine that the engine is expected to fail to start based on determining that the first values of the one or more parameters do not satisfy one or more thresholds relating to performance of the engine.

15. The engine of claim 10, wherein the at least one controller is configured to determine that an emissions output of the engine is expected to exceed an emissions output threshold based on the temperature and a fuel composition comprising multiple fuels.

16. A method of emissions reduction for cold start engine operation, the method comprising:

detecting a first temperature value associated with an engine at a starting of the engine;

comparing the first temperature value to a first temperature threshold;

responsive to the first temperature threshold exceeding the first temperature value:

engaging an intake valve delay system to delay opening of an intake valve; and engaging an electric heater;

detecting a second temperature value associated with the engine subsequent to the first temperature value;

comparing the second temperature value to a second temperature threshold, greater than the first temperature threshold; and responsive to the second temperature value exceeding the second temperature threshold, disengaging one of the intake valve delay system or the electric heater while maintaining the engagement of the other of the intake valve delay system or the electric heater.

17. The method of claim 16, further comprising:

engaging the electric heater responsive to a comparison of a battery state of charge (SoC) to a SoC threshold.

18. The method of claim 16, further comprising:

determining, based on a fuel composition of a multi-fuel vehicle, the first temperature threshold.

19. The method of claim 16, wherein the engine has a compression ratio of less than 15:1.

20. The method of claim 18, further comprising:

detecting a third temperature value associated with the engine subsequent to the second temperature value;

comparing the third temperature value to a third temperature threshold, greater than the second temperature threshold; and responsive to the third temperature value exceeding the third temperature threshold, disengaging the other of the intake valve delay system or the electric heater.

* * * * *